United States Patent

[11] 3,624,716

[72] Inventor Ralph L. Jaeschke
 Kenosha, Wis.
[21] Appl. No. 30,113
[22] Filed Apr. 20, 1970
[45] Patented Nov. 30, 1971
[73] Assignee Eaton Yale & Towne Inc.
 Cleveland, Ohio

[54] ADJUSTABLE SPEED PULLEY
 13 Claims, 3 Drawing Figs.
[52] U.S. Cl. .................................................. 74/230.17
[51] Int. Cl. .................................................. F16h 55/52
[50] Field of Search .................................................. 74/230.17
 C, 230.17 TL, 230.17 A, 230.17 L

[56] References Cited
 UNITED STATES PATENTS
| 2,034,666 | 3/1936 | Reeves | 74/230.17 L |
| 1,648,173 | 11/1927 | Green et al. | 74/230.17 L |
| 2,714,313 | 8/1955 | Gerbing | 74/230.17 L |
| 2,842,355 | 7/1955 | Lang | 74/230.17 C |
| 2,952,161 | 9/1930 | Williams | 74/230.17 TL |

FOREIGN PATENTS
764,844 1/1957 Great Britain ................ 74/230.17 L

Primary Examiner—C. J. Husar
Attorney—Teagno & Toddy

ABSTRACT: An adjustable speed pulley comprises first and second flange members which define a belt-receiving groove therebetween. A body member supports the second flange member for axial movement toward and away from the first flange member. The second flange member and the body member have cooperating bearing surface portions. The body member and the second flange member also define a pair of lubricant chambers on opposite axial sides of the cooperating bearing surface portions. Seal means for sealing the lubricant chambers is carried by the second flange member and is movable with the second flange member upon axial movement thereof. One of the lubricant chambers increases in volume and the other of the lubricant chambers decreases in volume upon axial movement of the second flange member relative to the body member. The adjustable speed pulley includes means providing for fluid communication between the pair of lubricant chambers and for directing lubricant from the chamber of decreasing volume into the chamber of increasing volume upon axial movement of the second flange member.

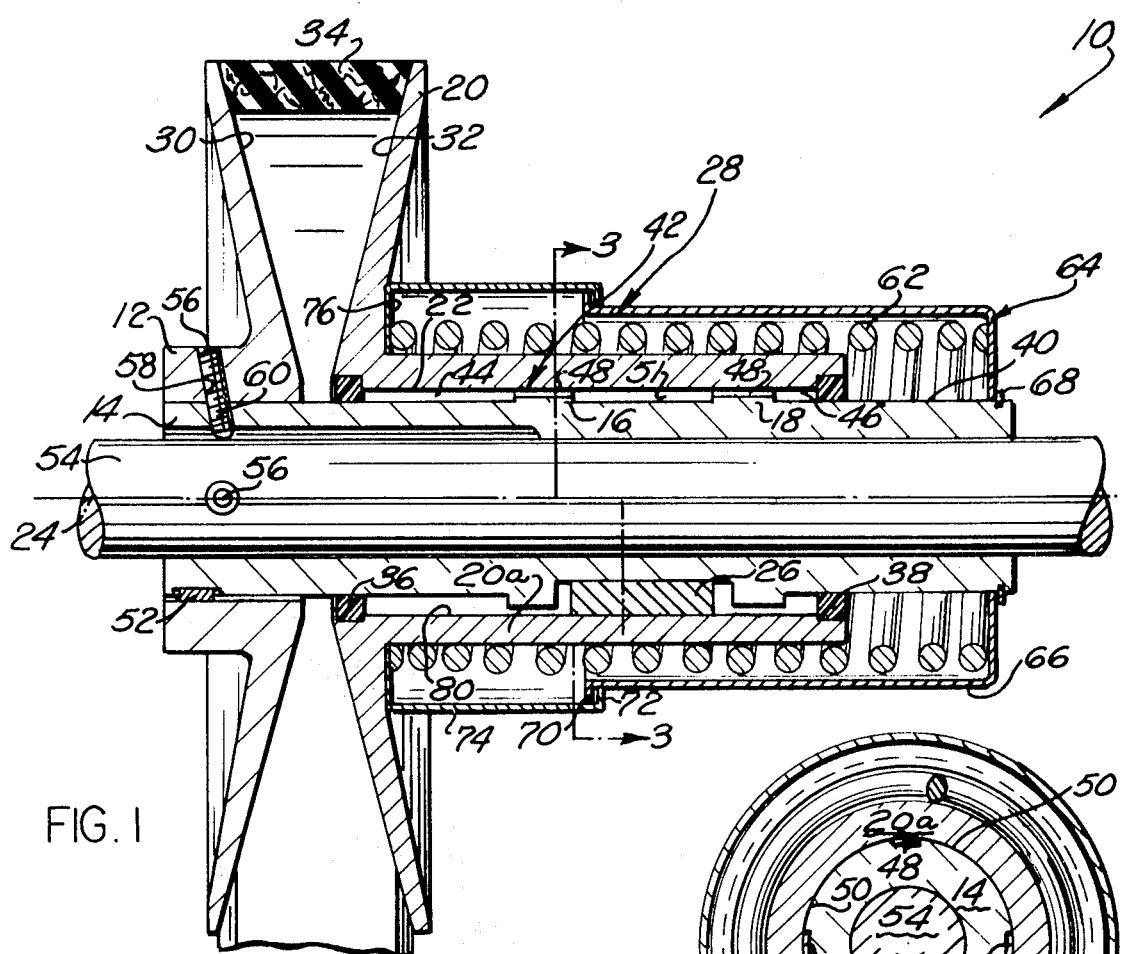
FIG. 1
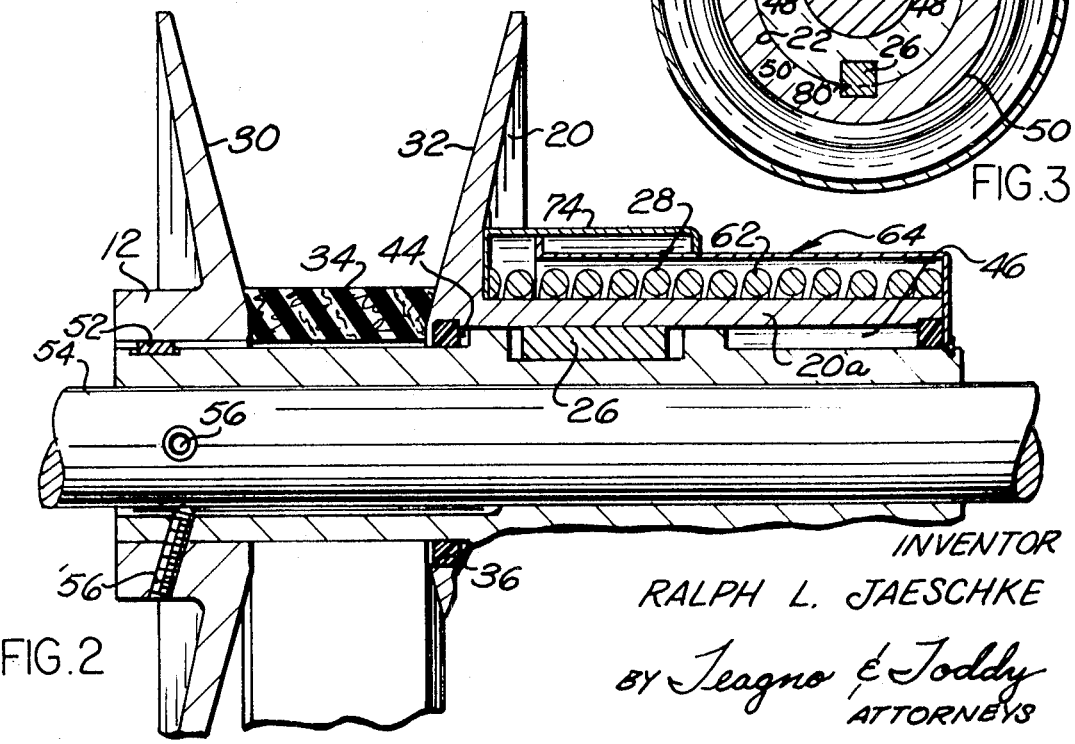
FIG. 2
FIG. 3
INVENTOR
RALPH L. JAESCHKE
BY Teagno & Toddy
ATTORNEYS

ADJUSTABLE SPEED PULLEY

The present invention relates to an adjustable speed pulley, and more particularly to an adjustable speed pulley having provision for lubricating relatively movable parts thereof.

Known adjustable speed pulleys include a pair of flange members which are axially movable relative to each other to vary the dimension of the belt-receiving groove defined therebetween. The one flange member which is movable axially relative to the other is generally supported on a body member and slidable axially along the body member to effect the aforementioned adjustment. One such conventional adjustable speed pulley is adjustable by increasing the tension of the drivebelt which is positioned in the belt-receiving groove defined by the flange members. This particular type of adjustable pulley includes a biasing spring for biasing the movable flange member toward the other flange member. When the tension of the drivebelt is increased, the drivebelt forces the movable flange against the bias of the spring and away from the other flange member. This thereby decreases the effective diameter of the adjustable speed pulley. If the drivebelt is driven at a constant peripheral speed, the rotational speed of the adjustable speed pulley will increase as the flange members move away from each other to consequently decrease the size of the pitch circle of the adjustable speed pulley. It should be understood that the converse is true when the tension on the drivebelt decreases.

Since the movable flange member is required to move freely with respect to the body on which it is mounted, it is important that lubrication is present between the movable flange member and the body. Such lubricant increases the freedom of movement of the flange member, and thereby increases the reliability and response time of such an adjustable speed pulley.

The present invention provides an adjustable speed pulley having first and second flange members defining a belt-receiving groove therebetween. A body member supports the second flange member for axial movement toward and away from the first flange member. The second flange member and the body member have cooperating bearing surface portions which require lubrication. A pair of lubricant chambers are located on opposite axial sides of the cooperating bearing surface portions. Seal means for sealing the lubricant chambers and preventing leakage therefrom is provided on the movable flange member and is movable with the movable flange member. As a result of the seals moving with the movable flange member, one of the lubricant chambers increases in volume and the other of the lubricant chambers decreases in volume upon axial movement of the movable flange member. The present invention includes means providing for fluid communication between the lubricant chambers and for directing lubricant from the chamber of decreasing volume into the chamber of increasing volume upon axial movement of the movable flange member.

The means which provides for lubricant flow from the chamber of decreasing volume into the chamber of increasing volume prevents any substantial increase in pressure of the lubricant in the chamber of decreasing volume. If a substantial increase in pressure in the chamber of decreasing volume occurred, it would create problems relating to leakage of the lubricant and also may cause damage to the seals. In order to handle such a pressure increase, complicated and refined seals may be required. In accordance with the present invention, such increase in pressure is prevented and thereby obviates the need for a refined complicated seal between the flange member and the body member upon which it moves.

Accordingly, it is an object of the present invention to provide a new and improved adjustable speed pulley having a pair of flange members, one of which is movable axially relative to the other and is supported on a body member for such movement, and wherein lubrication of cooperating bearing surfaces of the flange member and the body member is effected without the need for complicated or refined seals and with a minimum of leakage problems.

A further object of the present invention is the provision of a new and improved adjustable speed pulley having a pair of flange members, one of which is movable axially on a body member relative to the other on a body member, the flange member and body member having cooperating bearing surfaces and a pair of axially spaced, lubricant chambers on opposite axial sides of the bearing surfaces, and wherein provision is made for preventing leakage of the fluid from the chambers by the use of seals carried by the movable flange member and means is included for providing for flow of lubricant between the chambers upon adjustment of the movable flange member.

It is a further object of the present invention to provide a new and improved adjustable speed pulley, as noted in the preceding object, wherein the lubricant is moved by centrifugal force from the lubricant chambers into engagement with the bearing surfaces between the body and the flange member.

Further objects, advantages, and features of the present invention will be apparent to those skilled in the art to which it relates from the following detailed description of a preferred embodiment thereof made with reference to the accompanying drawings forming a part of this specification and in which:

FIG. 1 is an axial cross-sectional view of an adjustable speed pulley of the present invention;

FIG. 2 is a fragmentary, axial cross-sectional view of the adjustable speed pulley of the present invention, showing parts thereof in a different position from those of FIG. 1; and FIG. 3 is a cross-sectional view of the adjustable speed pulley shown in FIG. 1, taken along lines 3—3 of FIG. 1.

The present invention provides an adjustable speed pulley which has a variable effective diameter which varies upon a change in the tension of the drivebelt associated therewith. The adjustable speed pulley of the present invention has a flange member secured to a body and a movable flange member slidably mounted on the body. The present invention provides for effective lubrication of the movable flange member with respect to the body, such that the movable flange member may be readily moved axially thereon. A lubricant is maintained between the movable flange member and the body and provision is made to prohibit the leakage of lubricant from between the movable flange member and the body. The present invention may be applied to adjustable speed pulleys of a wide variety of constructions and designs, and for purposes of illustration, is described in the drawings as applied to an adjustable speed pulley 10, as shown in FIG. 1.

The adjustable speed pulley 10 includes a pair of flange members 12 and 20 which define a belt-receiving groove therebetween. The flange member 12 is fixedly and drivingly connected with the body member 14 for axial movement toward and away from the flange member 12 to thereby effect a change in the distance between the flange members and a change in the dimension of the belt-receiving groove defined by the flange member. The body 14 is rotatable about an axis 24 and has portions 16, 18 thereon which extend from the outer peripheral surface 40 of the body 14 and support the flange member 20 thereon. The portions 16, 18 of the body member have outer peripheral surface portions 50 which constitute bearing surfaces which cooperate with bearing surface portions of the flange member 20 to support the flange member 20 on the body member 14.

The movable flange member 20 has a projecting hub portion 20a having an opening 22 therein and the extending portions 16, 18 of the body member 14 are received in the opening 22. The hub portion 20a is an elongated projecting portion which extends concentrically with the body member 14 and axially along a major portion of the body member 14. The bearing surface portions on the flange member 20 which cooperate with the bearing surface portions 50 of the projecting portions 16, 18 comprise portions of the surface defining the opening 22 through the flange member 20. Any conventional means, such as a key 26, is provided for drivingly connecting the movable flange member 20 and the body member 14 so that the movable flange member rotates with the body member. The key 26 is fixedly secured to the body 22 and is received in an axially extending slot 80 in the flange member 20, which slot 80 provides for axial movement of the flange member 20 relative to the key 26 without effecting a drive therebetween.

The flanges 12, 20 have complementary surfaces 30, 32, respectively, thereon for receiving a drivebelt 34 therebetween. In operation, the drivebelt 34 is associated with a complementary pulley so that torque is transmitted between the complementary pulley and the adjustable pulley 10. By varying the center distance between the complementary pulley and the adjustable pulley and, consequently, the tension in the drivebelt 34, the pitch circle of the adjustable speed pulley may be varied. For example, when the center distance is increased, the tension in the drivebelt 34 increases and, consequently, moves the movable flange so that its belt-supporting surface 32 moves away from the belt-supporting surface of the flange 12 and against the bias of a biasing spring 28 which biases the flange 20 toward the flange 12. Due to this movement, the effective diameter or the pitch circle of the adjustable speed pulley 10 decreases. If the linear speed of the belt 34 remains constant, the rotational speed of the pulley will, consequently, increase when the effective diameter decreases. Conversely, it should be understood that when the center distance decreases, the effective diameter of the pulley 10 correspondingly increases to thereby decrease the rotational speed of the adjustable pulley 10 for a given belt speed.

In order to allow the movable flange 20 to move freely along the body 14, a lubricant is provided therebetween. Sealing means 36, 38 are provided on the ends of the movable flange 20. The sealing means 36, 38 may comprise any conventional seal which prevents the leakage of lubricant from between the body member 14 and the flange member 20. The sealing means 36, 38 slide along the outer peripheral surface 40 of the body 14 upon movement of the flange member 20. The sealing means 36, 38 maintain lubricant in the space, generally indicated 42 in the drawings, and which space is between the flange member 20 and the body member 14.

The space 42 includes a first chamber 44 defined by the sealing means 36, the surface 40 of the body member 14, and extending portion 16 of the flange member 20. The space 42 also includes a second chamber, generally indicated at 46, which is defined by the sealing means 38, the flange member 20, extending portion 18, and a portion of the surface 40 of the body member 14. The chambers 44, 46 are located on opposite axial sides of the bearing surface portions 50 of the body member 20.

It should be understood from the above that, as the flange member 20 moves to the right, as viewed in FIG. 1, away from the flange member 12, the chamber 44 will decrease in volume, while the chamber 46 will increase in volume. Conversely, as the flange member 20 moves toward the flange member 12, the chamber 44 will increase in volume, while the chamber 46 will decrease in volume.

In order to prevent any substantial increase or decrease in the pressure of the lubricant in these chambers due to volume changes therein, the adjustable speed pulley of the present invention includes means for providing for fluid communication between the chambers and for directing lubricant from the chamber of decreasing volume and into the chamber of increasing volume upon axial movement of the flange member 20. The means which provides the fluid communication between the chambers 44, 46 comprises grooves 48 (See FIGS. 1, 3) which are provided in the extending portions 16, 18 of the body member 14. These grooves, as illustrated in FIG. 3, are three in number. However, any desired number of grooves or slots can be provided in these portions in order to provide the desired lubricant flow between the chambers 44, 46 which increase or decrease in volume upon adjustment of the flange 20. In the absence of provision for flow lubricant between the chambers 44, 46, the pressure in the chamber which decreases in volume will increase and may destroy the seal and cause leakage of fluid from the chamber. To compensate for increase in pressure, a highly refined seal construction which would greatly increase the cost of the adjustable speed pulley may be required. Accordingly, it should be apparent that the provision of the means providing for fluid communication between the lubricant chambers is a substantial advance in the art and simplifies the construction of the pulley 10 and increases the reliability thereof.

Lubricant which moves through the slots 48 and the extending portions 16, 18 of the body member 14 moves through a space or third chamber 51 located between the extending members 16, 18. The slots 48 in the projecting portion 18 communicate the chamber 46 with the space 51 and the slots 48 in the projecting portion 16 communicate the chamber 44 with the space 51.

It should be understood that no increase in pressure of the lubricant contained in the space 42 is realized as a result of movement of the flange member 20 with respect to the body member 14, since the sum of the volume of the first chamber 44 and second chamber 46 remains constant, even though one may be decreasing in volume and the other increasing in volume due to the movement of the flange member 20.

The lubricant which is contained in the space and in the chambers 44, 46 effects lubrication of the bearing surface portion 50 and the inner surface of the opening 22 of the flange member 20, due to the fact that the lubricant contained in the chambers gravitates toward these surfaces due to centrifugal force during rotation of the flange member 20. Accordingly, effective lubrication is provided between the flange 20 and body 14 and, yet, no pressure is effected or results due to movement of the flange member 20.

It can be seen from a more detailed analysis of the specific embodiment shown in FIGS. 1–3 that the flange 12 is secured to the body 14 by means of a key 52 received by a complementary slot or opening in the body 14 and the flange 12. The flange 12 and body 14 are drivingly connected or secured to a shaft 54 by means of threaded set screws 56, which extend through a threaded opening 58 in the flange member 12 and an opening 60 in the body member 14. When the pins 56 are tightened with respect to the shaft 54, the shaft 54 will rotate with the flange member 12 and body 14. It should be understood, of course, that the flange 12 and body 14 may be secured to the shaft 54 by any conventional means.

The biasing means 28 which urges the flange member 20 toward the flange member 12 to retain the belt 34 therebetween comprises a spring 62. The spring 62 is coaxial with respect to the body member 14 and is surrounded by cover means 64. The cover means 64 includes an outboard member 66 which is axially retained on the body 14 by any suitable fastening means, such as a split ring 68. The outboard member 66 surrounds the outboard portion of the spring 62 and has a radially extending flange 70 on the inboard portion thereof to cooperate with an outboard flange 72 in the inboard member 74. The outboard portion of the outboard cover 66 engages one end of the spring 62 so as to prevent the spring from moving axially relative to the body 14.

The inboard cover member 74 has an inboard flange 76 which is received by the movable flange member 20 and is urged toward the movable flange member 20 by the other end of the spring 62. The cover means 64 eliminates the danger of injury when the adjustable speed pulley 10 is in operation and the movable member 20 is in motion. The cover 64 also prevents dust and other foreign particles from entering the adjustable speed pulley 10 and jamming the movement of the movable flange member 20 with respect to the body 14. As shown in FIG. 2, the cover means 64 allows for movement of the movable flange member 20 without restricting movement thereof.

In accordance with the above, it should be apparent that applicant has provided a new and improved adjustable speed pulley in which the flange member 20 is movable toward and away from the flange member 12 by increasing the tension of the belt 34 on the flange member 20. When the belt tension is increased or decreased, the flange member 20 is moved against the bias of the spring or by the spring away from the flange member 12 or toward the flange member 12, as the case may be. Provision is made for effective lubrication of the bearing surface portions between the flange member 22 and the body member 14 which support the flange member for axial movement. The space between the flange member 22 and the body member 14 which contains lubricant is divided into chambers which increase and decrease in volume, respectively, upon axial movement of the flange member, and means provides for fluid communication between the chambers so as to prevent pressure buildups within the chambers causing problems with the seals between the flange member and the body member.

What I claim is:

1. An adjustable speed pulley comprising first and second flange members defining a belt-receiving groove therebetween, a body member supporting said second flange member for axial movement toward and away from said first flange member, said second flange member having a hub portion projecting axially along said body member, said second flange member hub and said body member having cooperating bearing surface portions, said body member and said second flange member hub defining a pair of lubricant chambers on opposite axial sides of the cooperating bearing surface portions, sealing means for sealing said lubricant chamber and movable with said second flange member upon axial movement thereof, one of said lubricant chambers increasing in volume and the other of said lubricant chambers decreasing in volume upon axial movement of said second flange member, means providing for fluid communication between said pair of lubricant chambers and for directing lubricant from the chamber of decreasing volume into the chamber of increasing volume upon axial movement of said second flange member, and means securing said first flange member to said body member.

2. An adjustable speed pulley as defined in claim 1 further including spring means biasing said second flange member toward said first flange member and wherein said second flange member is movable away from said first flange member upon an increase in tension of the belt received in the groove between said flange members.

3. An adjustable speed pulley as defined in claim 1 wherein said means providing for fluid communication between said pair of lubricant chambers comprise slots provided in said bearing surface portions in said body member and which provide for communication between said pair of lubricant chambers.

4. An adjustable speed pulley as defined in claim 3 wherein said bearing surfaces are formed on projecting portions of said body member and said lubricant gravitates into engagement with said bearing surface portions due to centrifugal force acting thereon.

5. An adjustable speed pulley as defined in claim 4 wherein said projecting portions include a first projecting portion and a second projecting portion spaced axially along said body such that a third chamber is defined by the space therebetween, said projecting portions having openings therein comprising said means and which openings allow the lubricant contained in the chamber of decreasing volume to flow therefrom toward the chamber of increasing volume through the third chamber upon movement of the second flange member with respect to the body member.

6. An adjustable speed pulley as defined in claim 5 wherein said openings in said projecting portions comprise a plurality of slots in said body member which extend generally axially thereof and which are circumferentially spaced therearound.

7. An adjustable speed pulley comprising a body for rotation about an axis, said body having an outer peripheral surface, a first flange member fixedly secured to said body, said body having portions extending from said outer peripheral surface, a second flange member supported by said portions for movement along the rotational axis of said body, said first and second flange members having complementary surfaces for receiving a drive belt therebetween, said body and the second flange member defining first and second chambers therebetween for retaining lubricant therein, the chambers having a volume dependent on the position of the second flange member with respect to said body, the total volume of the first and second chambers being constant independent of the position of the second flange member, said body having means defining at least one passage between said first and second chambers for allowing the lubricant retained in the first chamber to flow from the first chamber toward the second chamber upon movement of the second flange member with respect to said body.

8. An adjustable speed pulley as defined in claim 7 wherein said extending portions of said body include bearing surface portions for supporting the second flange member and which surface portions have passages therein for allowing the lubricant retained in the first chamber to flow from the first chamber toward the second chamber upon movement of the second flange member with respect to said body.

9. An adjustable speed pulley as defined in claim 7 wherein said extending portions include a plurality of axially extending circumferentially spaced slots for allowing the lubricant retained in the first chamber to flow from the first chamber toward the second chamber with respect to the body.

10. An adjustable speed pulley as defined in claim 7 wherein said extending portions include a first and a second extending portion axially spaced along said body such that a third chamber is defined by the space therebetween, said extending portions having openings therein for allowing the lubricant retained in the first chamber to flow from the first chamber toward the second chamber through the third chamber upon movement of the second flange member with respect to said body.

11. An adjustable speed pulley as defined in claim 7 which includes a second flange member supported by said extending portions and biased toward the first flange member so that said second flange member moves with respect to said body when the tension in the drive belt is varied.

12. An adjustable speed pulley as defined in claim 11 which includes means for drivingly connecting said second flange member to said body for transmitting torque therebetween.

13. An adjustable speed pulley as defined in claim 7 wherein said second flange member has a pair of sealing means slidably engaging said body, and wherein the first chamber is partially defined by one of said sealing means and the second chamber is partially defined by another of said sealing means so that the lubricant retained in the space between said body and said second flange member is retained therebetween upon movement of said second flange member with respect to said body.

* * * * *